(12) United States Patent
Kim

(10) Patent No.: US 7,925,908 B2
(45) Date of Patent: Apr. 12, 2011

(54) APPARATUS AND METHOD FOR CONTROLLING SLOTTED MODE OF SEVERAL SYSTEMS USING ONE SLEEP CONTROLLER IN A HYBRID TERMINAL OF A MOBILE COMMUNICATION SYSTEM

(75) Inventor: Hye-Jeong Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 966 days.

(21) Appl. No.: 11/764,631

(22) Filed: Jun. 18, 2007

(65) Prior Publication Data

US 2008/0109669 A1    May 8, 2008

(30) Foreign Application Priority Data

Jun. 16, 2006 (KR) .................. 10-2006-0054329

(51) Int. Cl.
*G06F 1/26* (2006.01)
*G06F 1/32* (2006.01)

(52) U.S. Cl. ........ 713/320; 713/300; 713/321; 713/323; 713/324; 455/1; 455/73; 455/403

(58) Field of Classification Search .................. 713/300, 713/320, 321, 323, 324; 455/1, 73, 403
See application file for complete search history.

(56) References Cited

U.S. PATENT DOCUMENTS

| 7,605,701 B2 * | 10/2009 | Lee .......................... 340/572.1 |
| 2002/0078119 A1 * | 6/2002 | Brenner et al. ............... 709/102 |
| 2007/0136725 A1 * | 6/2007 | Accapadi et al. ............. 718/100 |

FOREIGN PATENT DOCUMENTS

KR    1020070040992    4/2007

* cited by examiner

*Primary Examiner* — Thomas Lee
*Assistant Examiner* — Michael J Brown
(74) *Attorney, Agent, or Firm* — The Farrell Law Firm, P.C.

(57) ABSTRACT

A method for controlling a slotted mode of several systems using one sleep controller enhanced a hybrid sleep controller that performs sleep/wake-up interface of system protocol stacks (PSs) in a hybrid terminal including at least two system PSs used for different communication networks of a mobile communication system. The method includes determining whether there is a shared hardware-waiting system according to a sleep request from a system PS; if there is no shared hardware-waiting system, turning off a clock of the sleep controller and power of shared hardware to enable operation in a real sleep mode; and if there is a shared hardware-waiting system, sending an active command to a corresponding system and simultaneously driving a sleep timer until a time that other systems wake up, to enable operation in a virtual sleep mode.

12 Claims, 7 Drawing Sheets

APPARATUS AND METHOD FOR CONTROLLING SLOTTED MODE OF SEVERAL SYSTEMS USING ONE SLEEP CONTROLLER IN A HYBRID TERMINAL OF A MOBILE COMMUNICATION SYSTEM

PRIORITY

This application claims priority under 35 U.S.C. § 119(a) to a Korean Patent Application filed in the Korean Intellectual Property Office on Jun. 16, 2006 and assigned Serial No. 2006-54329, the disclosure of which is incorporated herein by reference.

BACKGROUND OF THE INVENTION

1. Field of the Invention

The present invention relates generally to a sleep controller in a mobile communication system, and in particular, to an apparatus and method for controlling a slotted mode of several systems using one sleep controller in a hybrid terminal.

2. Description of the Related Art

Hybrid terminals capable of accessing and communicating with several types of communication networks, such as Code Division Multiple Access (CDMA), Global System for Mobile communication/General Packet Radio Service (GSM/GPRS), Universal Mobile Telecommunications System (UMTS), etc. are classified into three groups. The first group is limited to a terminal that can simultaneously access several communication networks, enabling inter-system handover; the second group consists of a terminal that can access one communication network at a time; and the third group is limited to a terminal having a mixed function of the other two terminals. The first group can be further classified into a terminal that includes Radio Frequency unit (RF) and Modem Hardware (H/W) separately for each individual system, and a terminal that includes the hardware simultaneously shared by several systems.

Most wireless communication protocols adopt a slotted mode to reduce power consumption. In the slotted mode, each terminal, after acquiring its initial synchronization, is allowed to monitor only the slot allocated thereto for the most time because a base station separately transmits specific messages to each individual terminal, like the page message, only at the slot allocated to each individual terminal.

A detailed description thereof will now be made with reference to the accompanying drawings.

FIG. 1 shows the timing of the slotted mode operation of a terminal in a general mobile communication system.

In FIG. 1, a particular terminal (or mobile station) determines receipt/non-receipt of a call or a message at a paging channel slot #5 allocated thereto.

For the other time, the terminal operates in power save mode that turns off power of all blocks except for the minimum hardware required for maintaining time synch, in order to reduce power consumption of the terminal. Generally, an interval for which the terminal operates in the power save mode is referred to as a sleep interval, and an interval for which the terminal normally operates is referred to as an idle interval, or a wake-up interval. In the sleep interval, the terminal counts a slow clock and the time that a sleep controller should wake up.

Sleep and wake-up processes of the terminal operating in the slotted mode are as follows.

A protocol stack of each system checks a sleep condition, and at a possible sleep time, the protocol stack calculates an expected sleep time, provides the sleep time information to a sleep controller, and turns off appropriate hardware blocks in sequence.

The sleep controller turns off the main clock of the modem at the next Pseudo Noise (PN) boundary, and counts the slow clock to generate a wake-up interrupt at the time that the terminal should wake up. The protocol stack provides information on timing offset between the main clock and slow clock to the sleep controller, and the sleep controller turns on the main clock of the modem at the correct time after compensating for the timing offset. The protocol stack turns on the appropriate (powered-off) hardware blocks. After waking up, the terminal performs a series of necessary operations after re-acquiring time synch with the base station, and repeats the sleep/wake-up processes in the same manner.

In the hybrid terminal having the hardware simultaneously shared by several systems, the sleep/wake-up controller is more complex. This is because the possibility of an operation of each system is determined according to priority determined separately for each individual system. For example, even on the condition that one system can sleep, whether the terminal can sleep is determined according to situations of other systems, and even on the condition that one system can wake up, whether the terminal can wake up is determined according to situations of other systems.

FIG. 2 is a diagram of a structure of the conventional hybrid terminal.

In the conventional hybrid terminal, as shown in FIG. 2, systems 205 and 210 each independently perform sleep control using their own sleep controllers 220 and 230, and systems 205 and 210 each independently control shared hardware resources 225, such as RF and modem. To prevent collision between systems, the hybrid terminal uses a system arbitrator 215, which is a control module for analyzing situations of all systems and determining whether to operate a particular system according to the analysis result. Each system sends a request for sleep or wake-up to system arbitrator 215 when necessary, and determines the next expected operation according to a response from this module.

A detailed description will now be made of an example of sleep/wake-up processes of the hybrid terminal.

In a terminal where two systems 205 and 210 operate, it is assumed that a system-1 protocol stack (PS) 205 performs the wake-up process, and a system-2 PS 210 performs the sleep process.

If system-2 PS 210 sends in Step 1 a sleep request to system arbitrator 215 as it is in a sleep condition, system arbitrator 215 informs in Step 2 system-2 PS 210 whether it will turn off the hardware, depending on the entire system situation. System-2 PS 210 sets a sleep controller #2 230 in Step 3, and turns off the hardware in Step 4 if needed.

Sleep controller #1 220 reports the occurrence of the wake-up interrupt to system-1 PS 205 in Step 5, when a wake-up interrupt has occurred therein, and system-1 PS 205 sends a wake-up request to system arbitrator 215 in Step 6. System arbitrator 215 informs in Step 7 system-1 PS 205 if it can wake up or it should turn on the hardware, depending on the entire system situation. In the situation where it cannot wake up, system-1 PS 205 calculates the next sleep interval and re-sets the sleep controller #1 220 in Step 8. In the situation where it should turn on the hardware, system-1 PS 205 turns on shared hardware 225 in Step 9. In addition to these control paths, there are possible interfaces with which the systems each report system situations, such as state change, to system arbitrator 215.

Even in the situation where one system has entered the sleep mode, when another system waits for an operation, the system should not turn off the shared hardware, such as RF and modem. In this case, if a system intending to sleep sends a sleep request to the system arbitrator, the system arbitrator notifies this situation to the system that has sent the sleep request. Upon receipt of the response from the system arbitrator, the system only operates its sleep controller without turning off the shared hardware, to inform the time that it should wake up.

Even though a wake-up interrupt has occurred in a sleep controller of an arbitrary system, if another system, which has higher priority than the system, is in operation, the system cannot wake up. Upon receipt of the wake-up interrupt from the sleep controller, the system sends a wake-up request to the system arbitrator, and the system arbitrator informs the requesting system of wake-up possibility and hardware-on possibility taking into account the situations of all systems. When wake-up is impossible, the system should sleep again until its next slot, and this is an inevitable process in the system sharing the hardware. Even though wake-up is possible, when the system needs to turn on the turned-off hardware resources, it additionally needs a hardware control process of compensating for a clock offset and turning on the clock and hardware, in addition to the software wake-up process. Otherwise, the system performs only the software wake-up process.

During a catnap when periodical wake-up of the Central Processing Unit (CPU) is performed to recognize an external input such as key interrupt or folder opening, the control gets even more complex. This is because the catnap is needed only when all systems are in the sleep mode, and the system should be able to process external inputs when all systems are in operation after waking up.

The conventional sleep control system operating in this manner needs as many sleep controllers as the number of systems, thus suffering from increased hardware complexity and a reduction in extensibility due to the large number of interfaces. In addition, sleep and wake-up processes should be implemented in all systems, causing an increase in overhead for realizing a protocol stack.

In addition, because the system arbitrator should have information on the current states of all systems, every time its state changes, each system should report the change to the system arbitrator, causing software overhead. Further, even during sleep and wake-up, each system should always send a report to the system arbitrator and receive necessary information there from, causing existence of many control paths and thus an increase in the processing time.

SUMMARY OF THE INVENTION

An aspect of the present invention is to address at least the problems and/or disadvantages and to provide at least the advantages described below. Accordingly, an aspect of the present invention is to provide an apparatus and method for controlling a slotted mode of several systems using one sleep controller in a hybrid terminal of a mobile communication system.

Another aspect of the present invention is to provide an apparatus and method for efficiently controlling sleep and wake-up processes of all systems using one sleep controller in a hybrid terminal where several systems coexist.

According to another aspect of the present invention, there is provided a method for controlling a slotted mode of several systems using one sleep controller that performs sleep/wake-up interface of system protocol stacks (PSs) in a hybrid terminal including at least two system PSs used for different communication networks of a mobile communication system. The method includes determining whether there is a shared hardware-waiting system according to a sleep request from a system PS; if there is no shared hardware-waiting system, turning off the clock of the sleep controller and power of shared hardware to enable operation in a real sleep mode; and if there is a shared hardware-waiting system, sending an active command to a corresponding system and simultaneously driving the sleep timer until the time that other systems wake up, to enable operation in a virtual sleep mode.

According to another aspect of the present invention, there is provided an apparatus for controlling a slotted mode of several systems using one sleep controller in a hybrid terminal of a mobile communication system. The apparatus includes at least two system protocol stacks (PSs), used for different communication networks, for generating a sleep request when a sleep condition is satisfied, and performing a software process upon receipt of a wake-up command; a hardware block shared by the several systems; a sleep controller for turning off the main clock for a sleep interval in response to a sleep/wake-up mode command, driving the main clock in response to a wake-up command, and generating the wake-up interrupt; and a hybrid sleep controller for turning off the clock of the sleep controller and power of the hardware block in response to at least one of a sleep request from a system PS and a presence/absence of a hardware block-waiting system, to enable operation in a real sleep mode, sending an active command to a corresponding system, and simultaneously driving the sleep timer until the time that other systems wake up, to enable operation in a virtual sleep mode.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
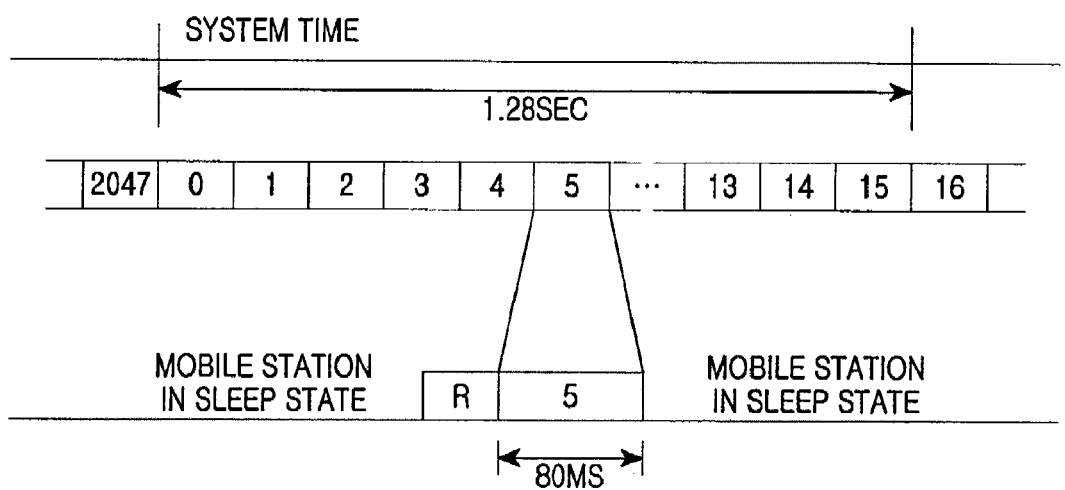
FIG. 1 shows the timing of a slotted mode operation of a terminal in a general mobile communication system.
Figure 2:
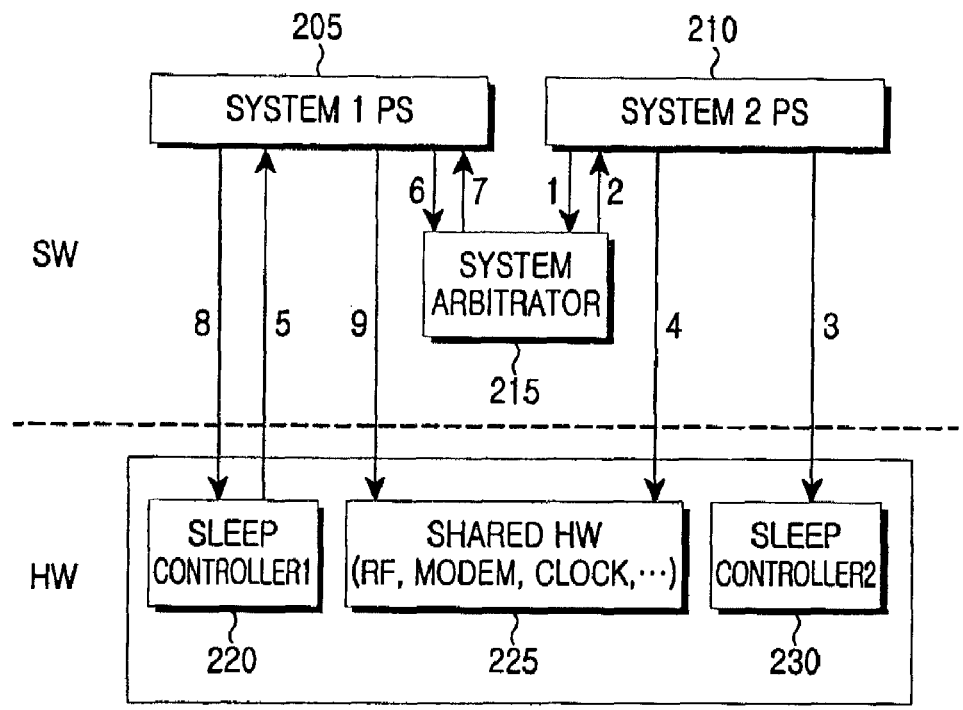
FIG. 2 is a diagram of a structure of a conventional hybrid terminal.
Figure 3:
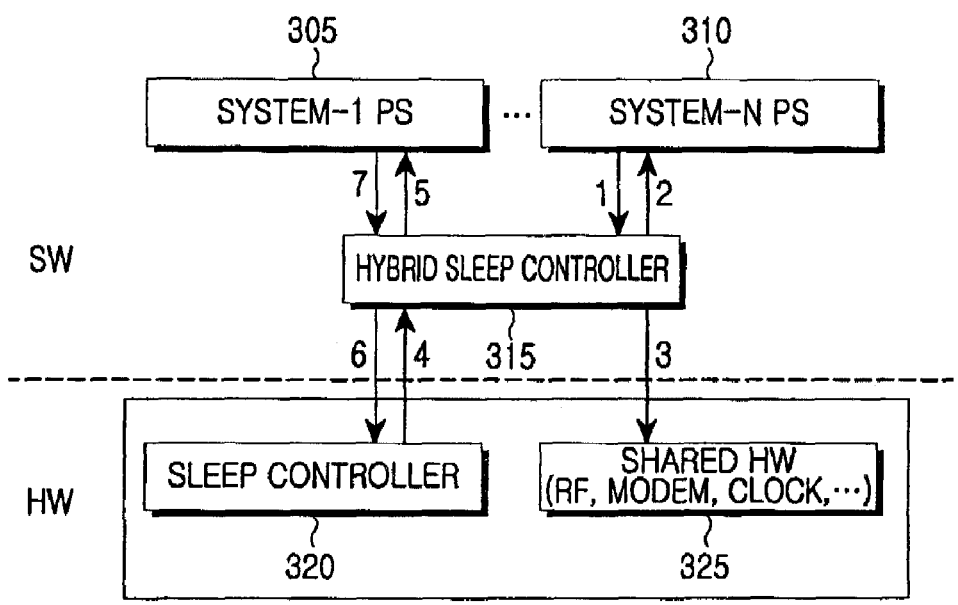
FIG. 3 is a block diagram illustrating the structure of a terminal according to the present invention.

Preferred embodiments of the present invention will now be described in detail with reference to the annexed drawings. In the following description, a detailed description of known functions and configurations incorporated herein has been omitted for clarity and conciseness.

The present invention relates to a hybrid-mode terminal (or hybrid terminal) in which several types of communication systems supported by the terminal time-share hardware resources such as Radio Frequency unit (RF) and modem, and in particular, to controller software that simultaneously processes sleep processors of several communication systems using one sleep controller hardware.

The terminal includes 'n' system Protocol Stacks (PS) 305 to 310, one Hybrid Sleep Controller (HSC) 315, one sleep controller 320 and a shared hardware 325. HSC 315 is a software module, and sleep controller 320 is a hardware module.

In the present invention, all sleep and wake-up related hardware interfaces, which were conventionally performed in the system PSs, are performed by HSC 315. System PSs 305 and 310 do not need to perform a monitoring operation and a control operation for the sleep controller and the hardware such as the clock and RF, and when a sleep condition is satisfied, system PSs 305 and 310 are allowed to send a sleep request to HSC 315 or perform the next software process upon receipt of a wake-up command from HSC 315. Herein, HSC 315 controls sleep and wake-up of several systems using one sleep controller 320 and a timer (not shown).

A detailed description will now be made of an example of sleep/wake-up processes of the hybrid terminal.

In the terminal where two systems 305 and 310 operate, it is assumed that a system-1 PS 305 performs a wake-up process and a system-2 PS 310 performs a sleep process. If system-2 PS 310 sends in Step 1 a sleep request to the hybrid sleep controller 315 as it is in a sleep condition, hybrid sleep controller 315 informs in; Step 2 system-2 PS 310 whether it will turn off the hardware, depending on the entire system situation. When there is a need to turn off hardware 325, hybrid sleep controller 315 directly turns off hardware 325 in Step 3.

Sleep controller 320, when a wake-up interrupt has occurred therein, reports in Step 4 the occurrence of the wake-up interrupt to hybrid sleep controller 315 and hybrid sleep controller 315 informs whether it can wake up or it should turn on the hardware, depending on the entire system situation. When wake-up is possible, HSC 315 sends a wake-up command to system-1 PS 305 in Step 5. However, when wake-up is not possible, HSC 315 calculates the next sleep interval and re-sets sleep controller 320 in Step 6. When there is a need to turn on the hardware, system-1 PS 305 turns on the hardware in Step 7.

The present invention classifies the sleep mode into a real sleep mode and a virtual sleep mode. When all systems of the terminal have entered the sleep mode, i.e. when there is no system using hardware of the terminal, the terminal operates in the real sleep mode of turning off the hardware. However, when there is any system in waiting or in operation, the terminal does not enter the sleep mode but operates in the virtual sleep mode in which the terminal counts sleep time of the sleep requesting system using a timer and reports arrival of wake-up time at the wake-up time.

Determination and execution of real sleep and virtual sleep are both achieved by HSC 315. Upon receipt of a sleep request message from an arbitrary system, HSC 315 analyzes states of other systems, and when there are other systems waiting to use the hardware, HSC 315 allocates hardware to the systems that wait for the hardware while performing virtual sleep. When all other systems are in the sleep state, i.e. in the virtual sleep state, HSC 315 calculates the sleep interval taking into account wake-up times of all systems, and then performs the real sleep mode.

The conventional terminal needs 5 interfaces for each individual system in this way, but the terminal according to the present invention can perform the sleep mode only with 2 interfaces separately for each individual system, in addition to 3 shared interfaces. In addition, when the number of interfaces between blocks decreases, the number of exceptional cases decreases and debugging is easy to perform. HSC 315 analyzes states of all systems only with the sleep request and appropriately controls the state of each system, so there is no need for additional interfaces from each system to the HSC 315.

A description will now be made of an example of a real sleep mode and a virtual sleep mode in a terminal that simultaneously supports two systems. It is assumed herein that as a system 1 is higher in priority than a system 2, when the system 1 should operate in an active state, the system 2, even though it is using hardware in the active state, should make a concession for the hardware and wait until the process of the system 1 is ended.

Figure 4:
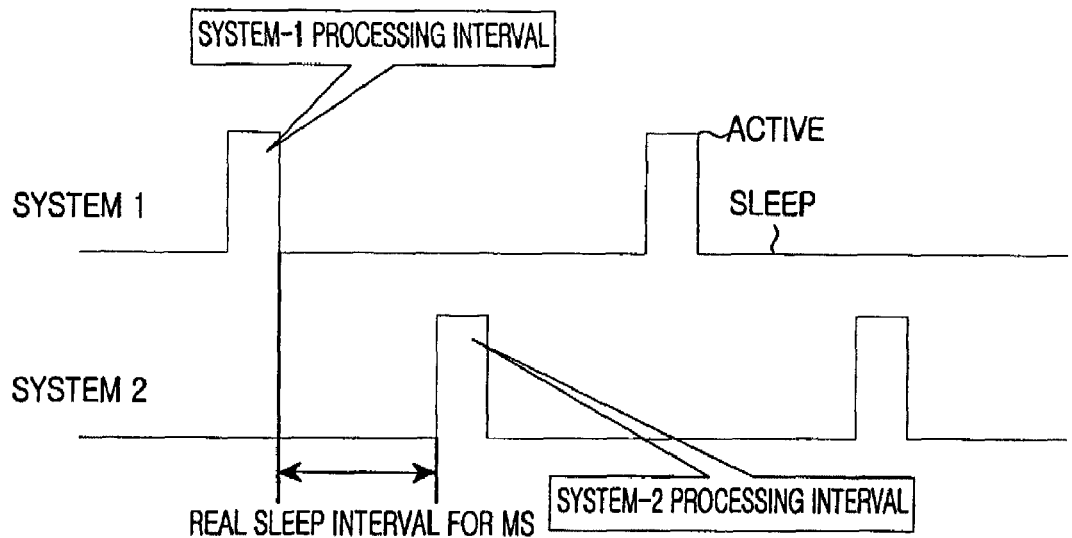
FIG. 4 is a timing diagram illustrating a real sleep mode according to the present invention.

In the case of FIG. 4, two systems both repeat sleep and wake-up in the idle state. System 2 is already in the sleep state at the time system 1 intends to sleep after completing its processing, and the wake-up time closest to the current time is the wake-up time of system 2. The HSC calculates a sleep interval taking into account the current time and the wake-up time of system 2, and performs real sleep for the sleep interval. Because terminal 1 enters the real sleep, system 2, although it was in virtual sleep, has no more need for virtual sleep, so it disables the timer.

Figure 5:
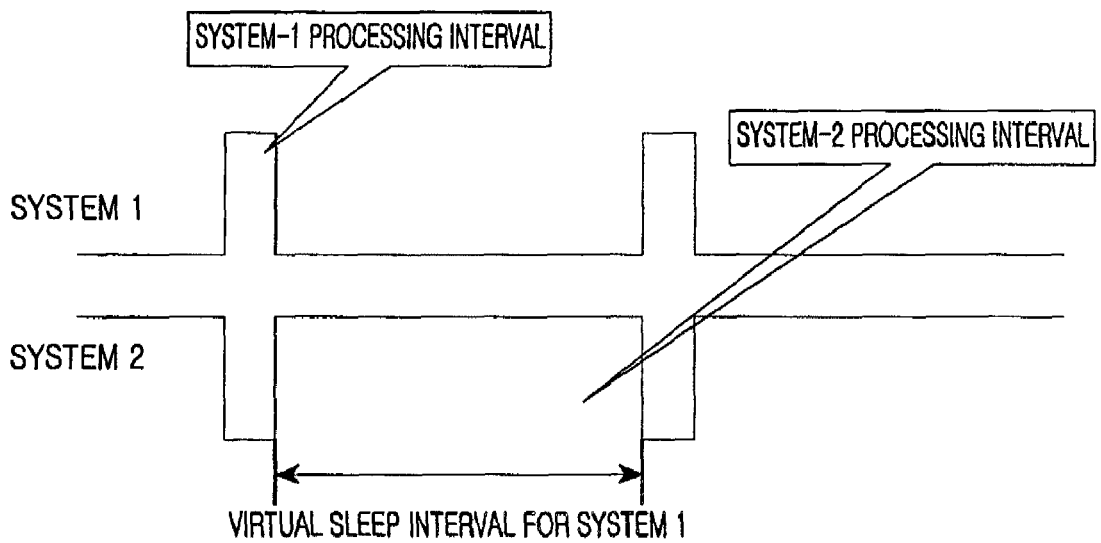
FIG. 5 is a timing diagram illustrating a virtual sleep mode according to the present invention.

In the case of FIG. 5, a system 1 is in an idle state and a system 2 is in an active state. When system 1 wakes up, system 2 stops its use of the hardware and waits until the process of system 1 is completed. After completing its process, system 1 sends a sleep request to the HSC. The HSC, because system 2 is in a waiting state, performs virtual sleep for the sleep interval of system 1, and informs system 2 of availability of the hardware.

Figure 6A:
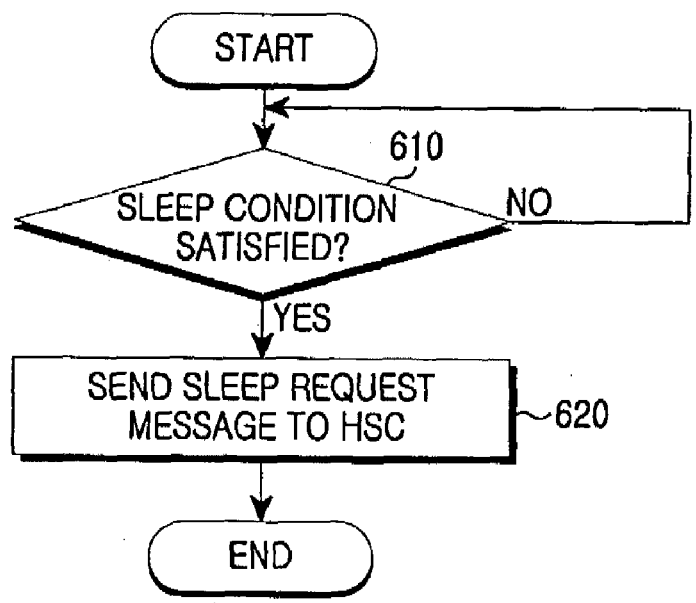
FIGS. 6A and 6B are flowcharts of an operating procedure of sleep/wake-up processes in a system PS according to the present invention.

In FIG. 6A, because the system PS has no need for monitoring or control for a sleep controller or hardware such as clock and RF, when a sleep condition is satisfied in step 610, the system PS sends a sleep request message to the HSC in step 620.

Figure 6B:
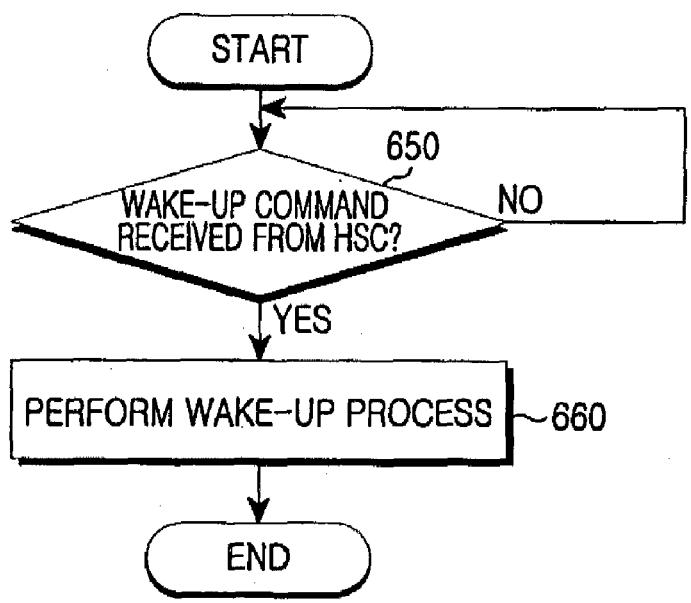

In step FIG. 6B, upon receipt of a wake-up command from the HSC in step 650, the system PS wakes up by performing a software wake-up process in step 660. In this manner, because the system PS has no interface to the sleep controller, when the system PS is in the sleep state, it provides the corresponding information to the HSC, and performs a wake-up process upon receipt of a wake-up command from the HSC.

Figure 7A:
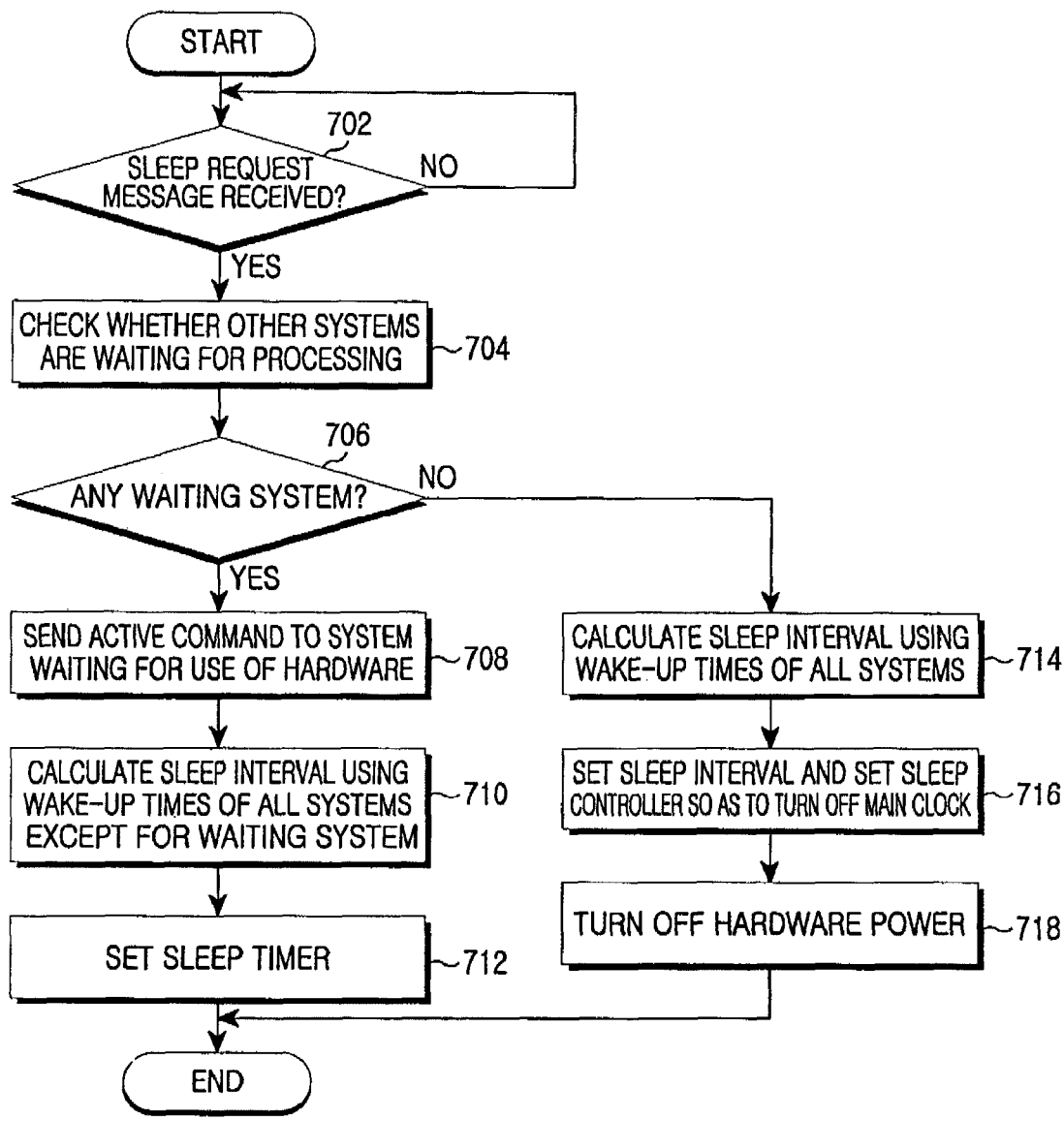
FIGS. 7A to 7C are flowcharts of an operating procedure of sleep/wake-up processes in an HSC according to the present invention.
Figure 7B:
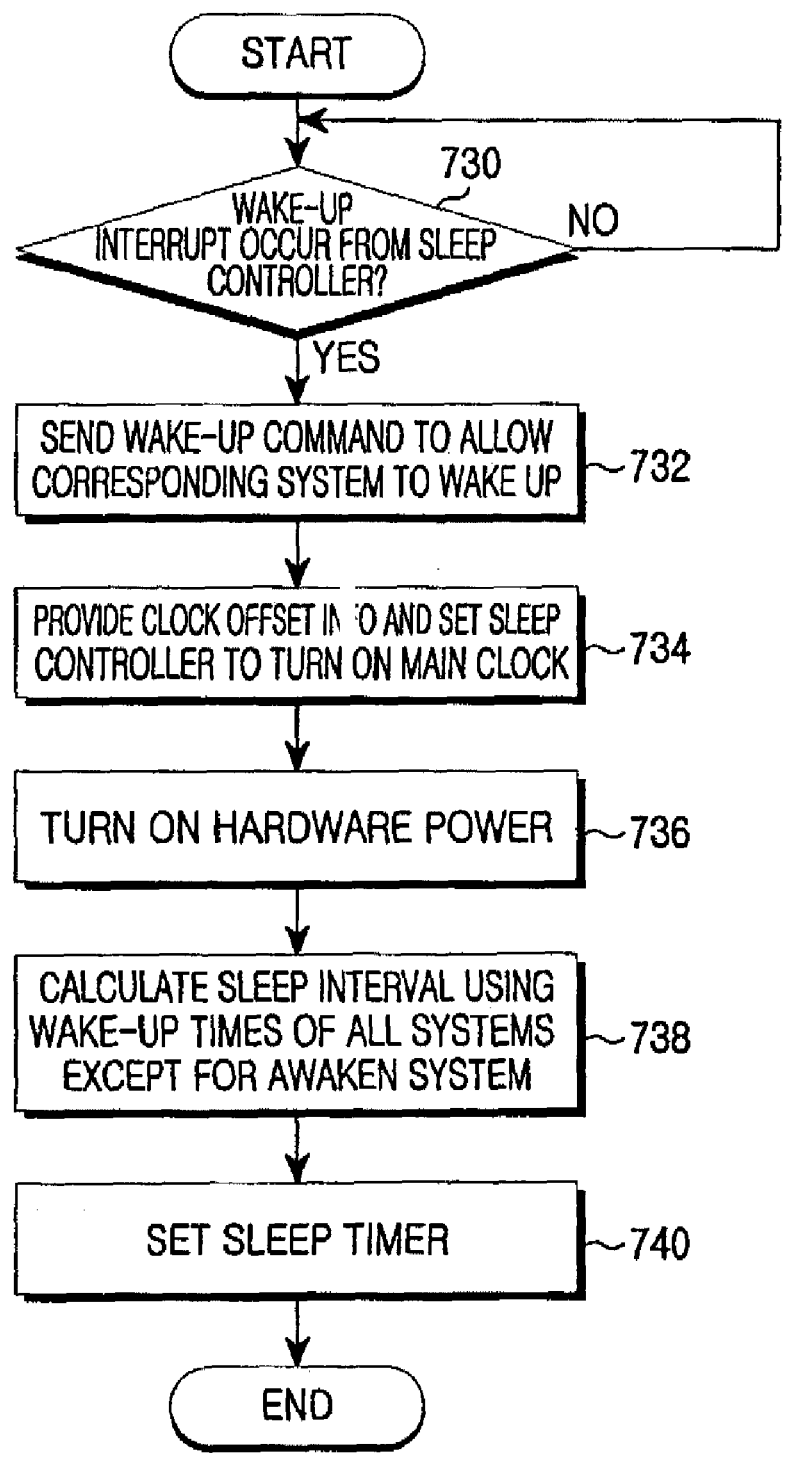
Figure 7C:
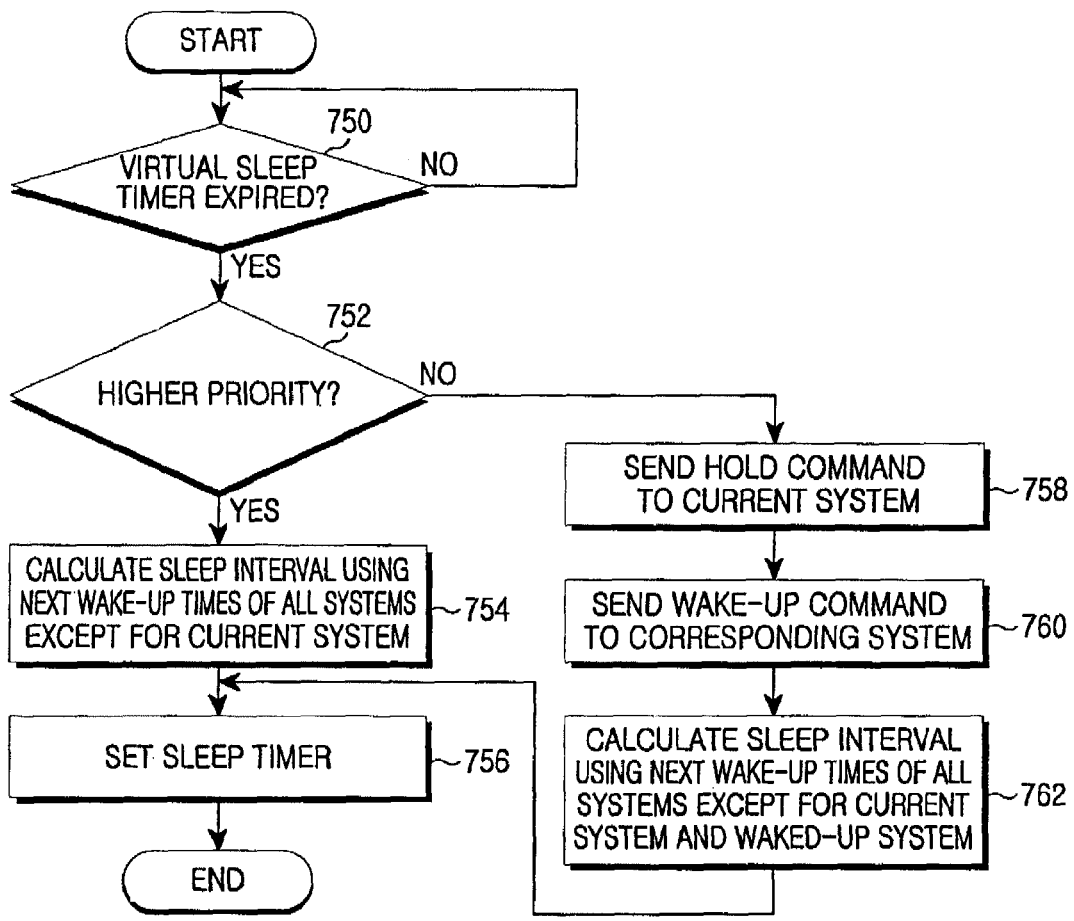

In FIGS. 7A to 7C, upon receipt of a sleep request message from an arbitrary system, the HSC determines whether the current state is a real sleep state or a virtual sleep state, and determines the system that it should drive when a sleep timer expires or when it receives a wake-up signal from the sleep controller. To this end, upon receipt of a sleep request from each system, the HSC stores a wake-up time of the system and stores a sleep related status.

Referring to FIG. 7A, upon receipt of a sleep request message from an arbitrary system in step 702, HSC analyzes in step 704 states of other systems and checks whether they are waiting for processing. In step 706, the HSC determines presence/absence of any waiting system. If it is determined in step 706 that there is no waiting system, the USC calculates in step 714 a hardware sleep interval to perform real sleep. In this calculation, the USC compares a wake-up time of the sleep requesting system with wake-up times of other systems currently in sleep, to select the earliest wake-up time, and calculates a hardware sleep interval from a sleep setting start time until the selected wake-up time. In step 716, the USC sets the calculated sleep interval, and simultaneously sets the sleep controller so that it may turn off the main clock of the modem. Thereafter, in step 718, the USC turns off the hardware power. At this time, if a virtual sleep timer is in operation, the USC releases the timer.

However, if it is determined in step 706 that a particular system is waiting for hardware allocation thereto, the USC performs virtual sleep through steps 708 to 712. That is, in step 708, the USC sends an active command to the particular system waiting for the hardware allocation. In step 710, the USC compares wake-up times of all systems except for the system waiting for hardware allocation, to select the earliest wake-up time, and then calculates a sleep interval from the sleep setting start time until the selected wake-up time. Thereafter, in step 712, the USC sets a sleep timer for the calculated sleep interval, and informs the allocation-waiting system that hardware has been allocated thereto. When more than one system is waiting for hardware allocation, the USC selects an appropriate system according to priority of the systems and the requirement of the terminal, and allocates the hardware to the selected system.

Referring to FIG. 7B, when a wake-up interrupt has occurred from a sleep controller in step 730, the USC sends in step 732 a wake-up command indicating the wake-up situation to the corresponding system. In step 734, the USC provides the sleep controller with information indicating a timing offset between a main clock and a slow clock, and the sleep controller compensates for the timing offset and then turns on the main clock of the modem at the set time. In step 736, the USC turns on power of the hardware. In step 738, the HSC determines whether there is any system requiring virtual sleep among the systems other than the waked-up (awaken) system, and if needed, the USC compares wake-up times of the systems to select the earliest wake-up time, and calculates a sleep interval from the sleep setting start time until the selected wake-up time. Thereafter, the HSC sets a sleep timer in step 740.

The reason for setting the timer during wake-up is because when the system allocated hardware continues its processing without sleeping until the time that another system should wake up, in order to perform access or handover, the HSC cannot recognize the time that another system should wake up. In addition, the HSC sets the timer because there is a possible case in which it should wake up another system after stopping the system currently in operation according to the requirement of the terminal. When the currently awaken system sleeps before expiration of the timer, the HSC compulsorily releases the timer as described above, and then performs real sleep processing.

Referring to FIG. 7C, if the virtual sleep timer has expired in step 750, i.e. if another system is operating at a wake-up time of one system, the HSC determines in step 752 if the system should be allocated hardware, according to priority of two systems and the requirement of the terminal. If it is determined in step 752 that the system currently in operation has higher priority, the HSC continuously maintains the hardware allocation and calculates the next wake-up time for the wake-up requesting system, in step 754. Thereafter, in step 756, the HSC selects the earliest wake-up time among the calculated wake-up times, and re-sets the sleep timer.

However, if it is determined in step 752 that the wake-up requesting system has higher priority, the HSC sends in step 758 a hold command to the system currently, in operation to stop its use of the hardware. In step 760, the HSC sends a wake-up command indicating the wake-up situation to the wake-up requesting system. Thereafter, in step 762, the HSC calculates the next wake-up times for the systems except for the current system and the awaken system. In step 756, the HSC selects the earliest wake-up time among the calculated wake-up times, and re-sets the sleep timer.

With use of the HSC operating procedures of FIGS. 7A to 7C, several systems of the hybrid terminal can control the slotted mode function.

As is apparent from the foregoing description, the present invention can realize slotted mode control of the hybrid terminal simultaneously supporting several communication systems, using one sleep controller and a timer, so the present invention is simple in terms of the inter-system control path compared to the prior art, thereby contributing to a reduction in the sleep and wake-up processing time. In this case, the idle time for which the terminal is awaken decreases, and the sleep time increases, thus contributing to a reduction in the power consumption of the terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling a slotted mode of several systems using one sleep controller enhanced by a hybrid sleep controller that performs sleep/wake-up interface of system protocol stacks (PSs) in a hybrid terminal including at least two system PSs used for different communication networks of a mobile communication system, the method comprising:

when a sleep request from a system PS is received, managing a wake-up time for the system;

determining if there is a shared hardware-waiting system according to the sleep request from the system PS;

turning off a clock of the sleep controller for a real sleep interval and turning off power of shared hardware to enable operation in a real sleep mode if there is no shared hardware-waiting system; and sending an active command to a corresponding system and simultaneously driving a sleep timer until a time that other systems wake up if there is a shared hardware-waiting system, to enable operation in a virtual sleep mode.

2. The method of claim 1, wherein the enabling of operation in a real sleep mode comprises:

calculating the real sleep interval until a first one of wake-up times of all systems; and setting the sleep controller so as to turn off a main clock for the calculated sleep interval, and simultaneously turning off hardware power.

3. The method of claim 1, wherein the enabling of operation in a virtual sleep mode comprises:

calculating a sleep interval until a first wake-up time among wake-up times of all other systems except for the waiting system.

4. The method of claim 1, wherein the enabling of operation in a virtual sleep mode comprises:

sending an active command to a system based on priority predetermined separately for each individual system if there are more than two shared hardware-waiting systems.

5. The method of claim 1, wherein the enabling of operation in a real sleep mode comprises:

controlling a corresponding system to wake up if the sleep controller initiates a wake-up interrupt;

compensating for a clock offset for the wake-up, driving a main clock of the sleep controller, and simultaneously turning on hardware power; and calculating a sleep interval until a first wake-up time among wake-up times of all systems except for the waked-up system, and driving a sleep timer for the calculated sleep interval to enable operation in the real sleep mode.

6. The method of claim 1, wherein the enabling of operation in a virtual sleep mode comprises:

comparing priorities of the currently operating system and the wake-up requested system if the sleep timer has expired;

setting the sleep timer to a sleep interval until a first one of next wake-up times of all systems except for the current system if the currently operating system has a higher priority; and stopping the currently operating system if the corresponding system has higher priority, sending a wake-up command to the corresponding system, calculating a sleep interval with next wake-up times of all systems except for the current system and the awaken system, and setting the sleep timer to the calculated, sleep interval.

7. An apparatus for controlling a slotted mode of several systems using one sleep controller in a hybrid terminal of a mobile communications system comprising:

at least two system protocol stacks (PSs), used for different communication networks, for generating a sleep request when a sleep condition is satisfied, and processing a wake-up command;

a hardware block shared by the several systems;

a sleep controller for turning off a main clock for a sleep interval in response to a sleep/wake-up mode command, driving the main clock in response to a wake-up command, and generating a wake-up interrupt; and a hybrid sleep controller to enable operation in a virtual sleep mode by turning off a clock of the sleep controller for a real sleep interval and turning off power of the hardware block in response to at least one of a sleep request from a system PS and a presence/absence of a hardware block-waiting system, to enable operation in a real sleep mode, sending an active command to a corresponding system, and simultaneously driving a sleep timer until a time that other systems wake up, wherein the hybrid sleep controller manages a wake-up time of the system when the at least one sleep request from the system PS is received.

8. The apparatus of claim 7, wherein the hybrid sleep controller calculates the real sleep interval until a first one of wake-up times of all systems, sets the sleep controller so as to turn off a main clock for the calculated real sleep interval, and simultaneously turns off hardware power to enable operation in the real sleep mode.

9. The apparatus of claim 7, wherein the hybrid sleep controller calculates a sleep interval until a first wake-up time among wake-up times of all other systems except for the waiting system.

10. The apparatus of claim 7, wherein if there are more than two shared hardware-waiting systems, the hybrid sleep controller sends an active command to a system determined according to priority predetermined separately for each individual system.

11. The apparatus of claim 7, wherein the hybrid sleep controller:

sends a wake-up command to a corresponding system if a wake-up interrupt occurs from the sleep controller;

compensates for a clock offset for the wake-up, drives a main clock of the sleep controller, and simultaneously turns on hardware power; and calculates a sleep interval until a first wake-up time among wake-up times of all systems except for the awaken system, and drives a sleep timer for the calculated sleep interval.

12. The apparatus of claim 7, wherein the hybrid sleep controller:

compares priorities of the currently operating system and the wake-up requested system if the sleep timer has expired; and sends an active command to a system having a highest priority, calculates a sleep interval with next wake-up times of all systems except for the awaken system, and sets the sleep timer to the calculated sleep interval.

* * * * *